United States Patent [19]

Beard

[11] Patent Number: 4,690,492
[45] Date of Patent: Sep. 1, 1987

[54] OPTICAL COUPLING

[75] Inventor: Robert W. Beard, Placerville, Calif.

[73] Assignee: Oximetrix, Inc., Mountain View, Calif.

[21] Appl. No.: 646,794

[22] Filed: Sep. 4, 1984

[51] Int. Cl.$^4$ .............................................. G02B 6/36
[52] U.S. Cl. ............................ 350/96.20; 350/96.21
[58] Field of Search ................ 350/96.20, 96.21, 96.22

[56] References Cited

U.S. PATENT DOCUMENTS

| | | | |
|---|---|---|---|
| 3,938,895 | 2/1976 | Bridger et al. | 350/96.20 X |
| 4,103,154 | 7/1978 | d'Auria et al. | 350/96.22 X |
| 4,135,779 | 1/1979 | Hudson | 350/96.20 X |
| 4,144,504 | 3/1979 | Leggett et al. | 357/68 X |
| 4,148,554 | 4/1979 | Magnusson et al. | 350/96.17 X |
| 4,192,574 | 3/1980 | Henry et al. | 350/96.20 X |
| 4,296,998 | 10/1981 | Dufft | 350/96.20 |
| 4,406,514 | 9/1983 | Hillegonds et al. | 350/96.21 |
| 4,410,469 | 9/1983 | Katagiri et al. | 350/96.20 X |
| 4,427,879 | 1/1984 | Becher et al. | 350/96.15 X |
| 4,435,037 | 3/1984 | Abramson et al. | 350/96.20 |
| 4,439,006 | 3/1984 | Stevenson | 350/96.20 |
| 4,523,802 | 6/1985 | Sakaguchi et al. | 350/96.12 |
| 4,553,811 | 12/1985 | Becker et al. | 350/96.20 |

FOREIGN PATENT DOCUMENTS 0100408 6/1984 Japan .................................. 350/96.20
0128508 7/1984 Japan .................................. 350/96.20

Primary Examiner—William L. Sikes
Assistant Examiner—Akm E. Ullah
Attorney, Agent, or Firm—Martin L. Katz; Robert W. Stevenson

[57] ABSTRACT

An optical module for coupling a fiberoptic catheter to a catheter oximeter processing apparatus. The optical module includes a plurality of light emitting diodes, each of which is mounted on a flat surface at the free end portion of a respective bracket. A plurality of optical fibers, which are adapted to be optically connected to the catheter, have their free ends secured to a mounting substrate in spaced positions and in closely spaced alignment with the diodes. The diodes are each individually provided with electrical connections that can be selectively actuated by the processing apparatus. The brackets, which are fixed at one end, are constructed of thin flexible material so that the diodes can each be adjusted generally in the plane of the receiving end faces of the optical fibers so as to obtain maximum light energy transfer therebetween.

10 Claims, 4 Drawing Figures

U.S. Patent   Sep. 1, 1987   4,690,492
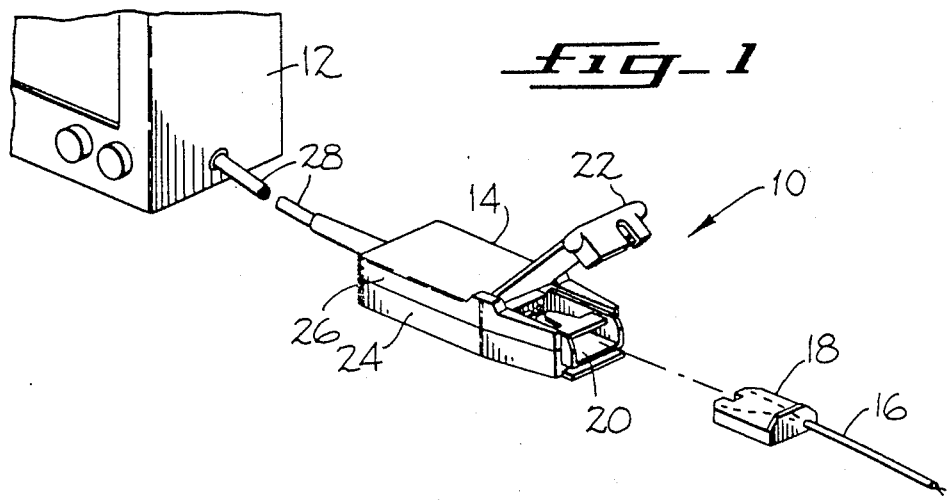
fig_1
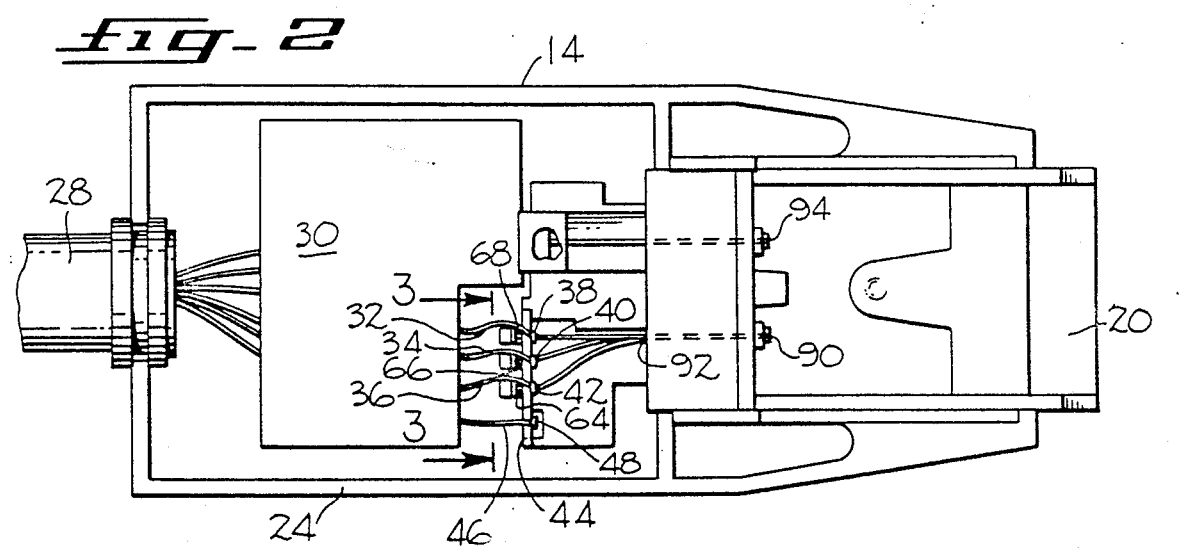
fig_2
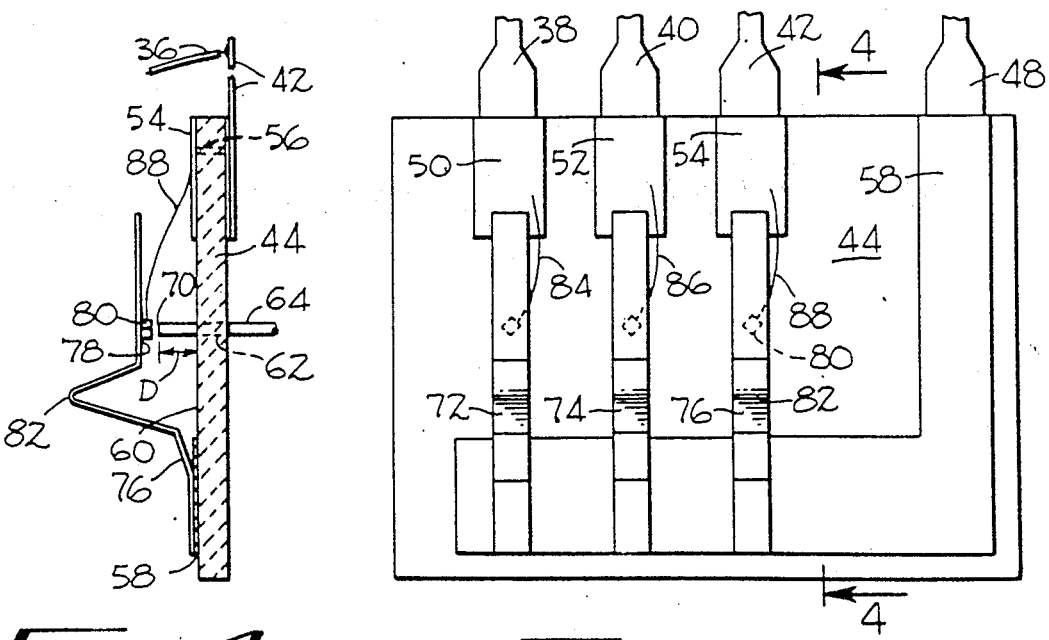
fig_4   fig_3

OPTICAL COUPLING

BACKGROUND OF THE INVENTION

1. Field of the Invention

This invention relates to an optical module that connects a catheter to a processor in a catheter oximetry system. More specifically, it concerns an optical coupling, that is located within the optical module, for coupling light between a light emitting diode and an optical fiber.

2. Description of the Prior Art

A catheter oximetry system provides accurate, continuous, real-time measurement of mixed venous oxygen saturation using multiple wavelength reflection spectrophotometry. The color of red blood cells progressively changes from scarlet to purple as the amount of oxygen that the red blood cells are carrying decreases. When light of different selected wavelengths illuminates the blood, the amount of light backscattered, or reflected, at each wavelength depends upon the color, and therefore, oxygen level of the blood. Careful choice of wavelengths allows accurate measurement of oxygenated hemoglobin with minimal interference by other blood characteristics such as temperature, pH, and hematocrit.

Approximately 98% of the oxygen in the blood is chemically combined with hemoglobin in red blood cells. The absorption of red and infrared light is substantially different for oxygenated and deoxygenated hemoglobin, and varies for different wavelengths of light within this red/infrared spectrum. Therefore, the relative amounts of oxygenated hemoglobin and deoxygenated hemoglobin in the blood can be determined by measuring the relative absorption of light at selected wavelengths. The percentage of hemoglobin which is in the oxygenated form is defined as the oxygen saturation of the blood in the equation:

$$\text{Oxygen Saturation} = \frac{HbO_2}{Hb + HbO_2} \times 100$$

where $HbO_2$ is the oxygenated hemoglobin concentration and $Hb$ is the deoxygenated hemoglobin concentration.

Earlier attempts at catheter oximetry often resulted in inaccurate measurements, since only two wavelengths of light were utilized. Observed light intensity measurements were related to oxygen saturation by implementing equations which were unable to compensate adequately for significant changes in the observed light intensities which were unrelated to changes in blood oxygen levels.

A catheter oximetry system that is manufactured by the assignee of this patent application, uses three, rather than two, wavelengths. These wavelengths were selected to compensate and correct for changes in light scattering (reflectance) from red blood cell surfaces and from other blood and blood vessel components, thereby providing a direct, accurate and reliable measurement of oxygen saturation. This system has three light-emitting diodes contained in an optical module to provide the light sources for the three selected wavelengths available for performing the oxygen saturation measurements. Light from each of these sources is sequentially transmitted at a rate of 244 pulses of each wavelength per second through a single optical fiber within a catheter to illuminate the blood flowing past the catheter tip.

This illuminating light is absorbed, refracted, and reflected by the blood, and a portion of this light is collected by an aperture of a second fiber. This collected light is returned through the catheter to a photodetector in the optical module. The photodetector converts these light signals to electrical signals which are amplified and transmitted to a processor. Using the relative intensities of the signals representing the light levels at the various wavelengths, the processor calculates oxygen saturation. The average oxygen saturation for the preceding five seconds is displayed in a digital readout of the processor display panel and recorded on a strip chart recorder. This computation is updated every second.

In coupling the three light-emitting diodes to a single integrator-optical fiber, each light-emitting diode is optically coupled to a Y-optical fiber, and the three Y-optical fibers are joined to the single integrator-optical fiber at a Y-to-integrator junction. Each light emitting diode to Y-optical fiber coupling has a butt coupling, or a direct coupling, with the elements being joined by epoxy cement. While the elements can be properly aligned before cementing, such alignment can be lost during the cementing operation. These couplings have a further disadvantage once the epoxy cement is set, since they cannot then be readjusted. If one coupling is out of alignment, the entire chip supporting the three couplings must be rejected because of high coupling losses at the misaligned coupling. Also, the optical qualities of the epoxy cement may change over time thereby leading to potential errors in the output readings.

The light emitting diodes used in the prior art devices are of the surface emitter type and emit light in a direction perpendicular to the plane of their p-n junction and likewise perpendicular to their largest geometric faces. It has proven to be difficult to correctly locate a light emitting diode to provide the maximum amount of light energy to a given optical fiber because of the small surface area on the end of the optical fiber accepting the light energy from the light emitting diode.

Proper alignment for optical couplings has often been a problem and has often been given extensive consideration by the prior art. U.S. Pat. No. 4,435,037 shows a light emitting diode mounted on a movable post within a housing in juxtaposition to the end of an optical fiber centered within a channel in a connector housing. The optical fiber is held stationary whereas the post supporting the light emitting diode is moved by a probe inserted through multiple aligning ports until the diode is properly positioned for optimum light coupling into the fiber. U.S. Pat. No. 4,296,998 discloses adjustably positioning an optical fiber relative to a light source to optimize the light output at the end of the fiber and locking the fiber in position within an aperture in a solder body by heating and cooling the solder. U.S. Pat. Nos. 4,135,779 and 4,103,154 disclose the coupling of a pair of optical fibers or optical fiber bundles to a third optical fiber or fiber bundle. U.S. Pat. No. 3,938,895 discloses a method for positioning an optical fiber that involves the passing of light through the optical fiber, detecting the output therefrom through the use of a position-sensitive photodetector, and moving the optical fiber so as to achieve a desired relationship to the position-sensitive photodetector.

SUMMARY OF THE INVENTION

In accordance with the present invention, there is provided an optical coupling. A mounting substrate is provided. An optical fiber extends through the substrate and is fixed therein. The light receptive end face of the optical fiber is located in a fixed position relative to the surface of the substrate. A deformable bracket, preferably made of electrically conductive material, includes a fixed portion mounted to the substrate and a free end portion elevated above the substrate with a flat surface thereon generally parallel to the end face of the optical fiber. A light emitting diode is mounted on the flat surface of the free end of the bracket adjacent to the optical fiber end face. Said bracket is flexible so that the free end thereof can be deformed by force generally in the plane of the flat surface so that the light emitting diode can be positioned to provide the maximum light energy to the optical fiber.

The optical coupling of the present invention is utilized in an optical module for connecting a fiberoptic catheter to a processor in a catheter oximetry system. A mounting substrate is provided within an enclosure in the module to secure a plurality of fiberoptic light guides in fixed positions, and a plurality of brackets with elevated free end portions carrying individual light emitting diodes are positioned so that the light emitting diodes are adjacent to the respective receiving ends of the light guides. By adjusting the free ends of the brackets each of the diodes can be precisely aligned with its associated light guide to provide maximum light energy transfer therebetween. The light guides are joined into a single light guide which is directed out of the enclosure to a position where it can be optically coupled to the fiberoptic catheter, and electrical leads are provided from the processor to selectively actuate the light emitting diodes.

BRIEF DESCRIPTION OF THE DRAWINGS

FIG. 1 is a broken perspective view of a catheter oximetry system that includes an optical module embodying the present invention.

FIG. 2 is a plan view of the optical module with the upper housing half removed.

FIG. 3 is an enlarged vertical section taken on the line 3—3 of FIG. 2.

FIG. 4 is a vertical section taken on the line 4—4 of FIG. 3.

DESCRIPTION OF THE PREFERRED EMBODIMENT

With reference to FIG. 1, a catheter oximetry system, indicated generally by reference numeral 10, includes a processor 12, an optical module 14, and fiberoptic catheter 16. The catheter has an optical connector plug 18 that slides into a mating receptacle 20 in the optical module. A hinged, spring loaded cover 22 holds the catheter's optical connector plug in position within the receptacle. The optical module has a housing formed by a lower half 24 and an upper half 26 which forms an enclosure within which the optical-to-electrical connections for transmission and receiving are made. These halves can be separated and the upper half removed to expose the interior optical-to-electrical couplings as shown in FIG. 2. The optical module is electrically connected to the processor by a cable 28.

Looking now at FIG. 2, which shows in detail the optical module 14, it will be seen that the electrical leads from cable 28 are connected to a printed circuit board 30. Positive electrical leads 32, 34 and 36 from the printed circuit board are connected to lead frames 38, 40 and 42 that are mounted to a substrate 44 made of ceramic material. A negative electrical lead 46 extends from a lead frame 48 on the substrate to the printed circuit board. As shown in FIGS. 3 and 4, mounting pads 50, 52 and 54 are mounted on the opposite side of the substrate from the lead frames 38, 40 and 42 and are electrically interconnected therewith by posts 56 (FIG. 4) extending through the substrate. A common negative mounting pad 58 is mounted on the opposite side of the substrate from lead frame 48 and is also electrically interconnected thereto by a post, not shown.

Looking again at FIG. 4, it will be seen that the substrate 44 has a flat surface 60, and three holes 62 (only one shown in FIG. 4) extend throgh the substrate perpendicular to the flat surface. Optical fibers 64, 66 and 68 (FIG. 2) extend through the substrate holes and are fixed therein by such means as cementing. Each optical fiber has an end face 70 (FIG. 4) that is located at a predetermined stand-off distance D from the flat. surface of the substrate, and the end face is parallel thereto.

Deformable brackets 72, 74 and 76, shown in FIG. 3, are made of an electrically conductive material that is a soft malleable metal, preferably gold ribbon. The brackets are mounted to the negative mounting pad 58 on the flat surface 60 of the substrate 44. These brackets each have a fixed portion secured to the mounting pad 58 and a free end portion extending therefrom to a position spaced from the substrate. The free end portion of each bracket has a flat surface 78 that is generally parallel to the end face 70 of the opposed optical fiber. A light emitting diode 80 is mounted on the flat surface of each bracket adjacent the associated optical fiber end face. The gap between the diode and the end face is preferably from 0 (contact) to about 0.005 inches. Each bracket has an accordian pleat 82 pointing away from the substrate. This pleat is located between the bracket mounting and the bracket flat surface. The offset ratio from the substrate flat surface 60 to the bracket flat surface and from the substrate flat surface to the tip of the pleat is about 3/7. Each bracket can thereby be deformed by force applied in the plane of the flat surface. Usually a vertically downward force is applied, but the bracket can be pulled upward or moved sidewise slightly also. Thus, each bracket can be aligned so the maximum amount of light emitted from the diode can be transferred to the optical fiber while spacing between the two is maintained.

The light emitting diodes 80 are electrically connected to the positive mounting pads 50, 52 and 54 by gold wires 84, 86 and 88, respectively (FIG. 3). Thus, current selectively flows from the positive mounting pads through the gold wires to selectively energize the diodes and then through the brackets 72, 74 and 76 to the negative mounting pad 58 on the return circuit. Each diode emits light at a different selected wavelength, and, as is conventional, the diodes are thereby each individually actuated in turn for very brief periods of time in a rapidly repeating sequence. The three optical fibers 64, 66 and 68 are joined to a single integrator optical fiber 90 (FIG. 2) at a Y-to-integrator junction 92. Light from optical fiber 90 is coupled to the catheter 16 within receptacle 20 and is transmitted through the catheter to the catheter tip, and reflected light is returned by the catheter to an optical fiber 94 having its receiving end face in the receptacle 20 aligned with the fiber 90. This fiber 94 is connected to a photodetector, not shown, on the printed circuit board 30 for providing an electrical signal back to the processor which is dependent on the light reflected by the blood at a given time.

From the foregoing description, it will be seen that an optical module 14 is provided which has an optical coupling therein formed by a ceramic substrate 44, optical fibers 64, 66 and 68, deformable brackets 72, 74 and 76, and three light emitting diodes 80 that emit light at different selected wavelengths. The deformable brackets are made of gold ribbon and have accordian pleats 82 pointing away from the substrate. The brackets can be deformed by force so that the light emitting diodes can be positioned to provide the maximum light energy transfer to the optical fibers.

Although the best mode contemplated for carrying out the present invention has been herein shown and described, it will be apparent that modification and variation can be made without departing from what is regarded to be the subject matter of the invention.

What is claimed is:

1. An optical coupling comprising
   a substrate having a flat surface and a hole extending through the substrate to the flat surface,
   an optical fiber extending through the substrate hole and fixed therein with an end face of the optical fiber located at a fixed position relative to the flat surface,
   a deformable bracket made of electrically conductive material having a first portion mounted to the substrate and having a free end portion extending from the first portion and spaced from the substrate, said free end portion having a flat surface located generally parallel to the end face of the optical fiber, and
   a light emitting diode mounted on the flat surface of the bracket adjacent the optical fiber end face,
   said bracket being formed of a soft malleable metallic ribbon whereby the bracket can be deformed by force generally in the plane of the optical fiber end face so that the light emitting diode can be positioned to provide the maximum light energy to the optical fiber.

2. The optical coupling of claim 1 wherein said free end portion of the bracket is provided with a pleat pointing away from the substrate.

3. The optical coupling of claim 2 wherein the ratio of offset of the bracket flat surface from the substrate flat surface and the outermost tip of the pleat from the substrate flat surface is about 3/7.

4. The optical coupling of claim 1 wherein said optical fiber and face is located at a predetermined standoff distance and parallel to the flat surface of the substrate.

5. The optical coupling of claim 1 wherein each deformable bracket is mounted to a common negative lead on the substrate.

6. The optical coupling of claim 5 including three lead frames mounted to the substrate, three mounting pads mounted to the substrate on the opposite side thereof from the lead frames, three posts interconnecting said lead frames and said mounting pads, and three conductive wires extending from the mounting pads to the respective light emitting diodes.

7. An optical module for connecting a fiberoptic catheter to a processor in a catheter oximetry system, said module comprising a housing providing an enclosure, a plurality of light emitting diodes mounted in said enclosure, a plurality of electrical leads, said leads being adapted to be selectively actuated by said processor to energize a selected one of said plurality of light emitting diodes, a mounting substrate, a plurality of brackets for independently mounting each of said diodes to said substrate, each bracket having a first portion fixed to the substrate and a free end portion spaced from the substrate, said diodes being mounted on the free end portions of said respective brackets facing said substrate, and a plurality of optical fiber light guides each having one end adapted to be optically connected to the fiberoptic catheter and each of said light guides having its other end mounted to extend through said substrate to a position closely adjacent to a respective one of said diodes whereby said free end portions of the brackets can be adjusted slightly in a plane generally parallel to the substrate so as to achieve a desired alignment of each of the diodes with a respective end of a light guide to obtain maximum light energy transfer therebetween.

8. An optical module as set forth in claim 7 wherein each of said leads comprise wires connected to a respective light emitting diode, and wherein each of said brackets comprise a conductive member for conducting a selected current through said brackets associated lead and diode.

9. An optical module as set forth in claim 7 wherein the free end portion of each of said brackets is provided with a pleat pointing away from said substrate.

10. An optical module for connecting a fiberoptic catheter to a processor in a catheter oximetry system, said module comprising a housing providing an enclosure, a mounting substrate within said enclosure, a plurality of optical fiber light guides secured to said substrate in spaced positions and so that the free end surfaces of the light guides are fixed with respect to the substrate and directed outwardly thereof, a plurality of brackets mounted within said enclosure, each of said brackets having a fixed portion and a free end portion projecting outwardly from the fixed portion, a plurality of light emitting diodes each mounted on a respective one of said free end portions of the brackets in a position generally aligned with a free end surface of a respective one of said light guides, means for joining each of said light guides into a single composite light guide, means for directing said composite light guide out of said enclosure to a position where said composite light guide can be optically coupled to said fiberoptic catheter, and means for connecting a plurality of separate electrical leads to said light emitting diodes for selective actuation of the diodes whereby said free end portions of the brackets can be adjusted slightly in a plane generally parallel to the free end surfaces of the light guides so as to achieve the desired alignment of each of the diodes with a respective free end surface to obtain maximum light energy transfer therebetween.

* * * * *